United States Patent [19]

Herrmann et al.

[11] 4,362,927

[45] Dec. 7, 1982

[54] PRESELECTION COUNTER WITH CONTINUOUS DISPLAY AND AUTOMATIC REPETITION OF A PRESET VALUE

[75] Inventors: Lothar Herrmann, Hornberg; Helmut Müller, St. Georgen, both of Fed. Rep. of Germany

[73] Assignee: Kienzle Apparate GmbH, Villingen, Fed. Rep. of Germany

[21] Appl. No.: 241,613

[22] Filed: Mar. 9, 1981

[30] Foreign Application Priority Data

Mar. 8, 1980 [DE] Fed. Rep. of Germany ....... 3009018

[51] Int. Cl.[3] ............................................ G06F 15/18

[52] U.S. Cl. ............................... 235/132 R; 235/1 C; 235/91 R; 235/94 R; 235/113; 235/139 R; 235/144 SP

[58] Field of Search ........................ 235/132 R–132 E, 235/1 C, 91 R, 91 D, 135, 137, 144.5 M, 144 SP, 94 R, 133 R, 139 R, 113; 53/52; 192/138; 222/14, 16, 27; 234/21

[56] References Cited

U.S. PATENT DOCUMENTS 4,172,220 10/1979 Muller et al. ............... 235/132 R X
4,244,515 1/1981 Kondo ............................ 235/132 R

*Primary Examiner*—Benjamin R. Fuller
*Attorney, Agent, or Firm*—Toren, McGeady and Stanger

[57] ABSTRACT

A preselection counter having a switch-off counter which is adapted to actuate a desired function when a quantity of this function determined by a preset value has been reached includes presettable indicating means having number rollers adapted to have the preset value set therein and to retain this setting through repeated cycles of operation of the switch-off counter. The presettable indicating means enable continuous display of the preset value during operation of the counter with the preset value being transferred from the number rollers of the switch-off counter by a sensing wheel mechanism which is operatively interposed therebetween and which may be repeatedly reset to the preset value on the preset counter after each cycle of operation of the switch-off counter without requiring changes in the preset value in the presettable indicating means.

5 Claims, 4 Drawing Figures

FIG. 2
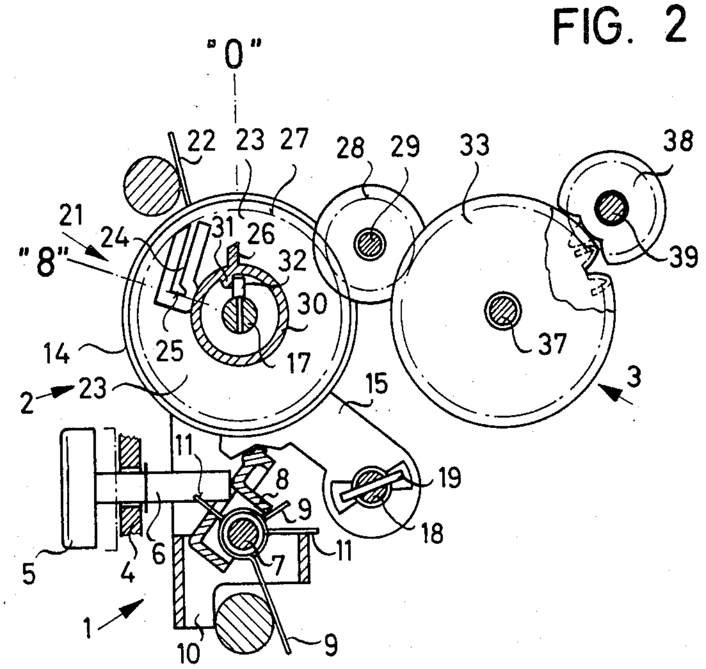
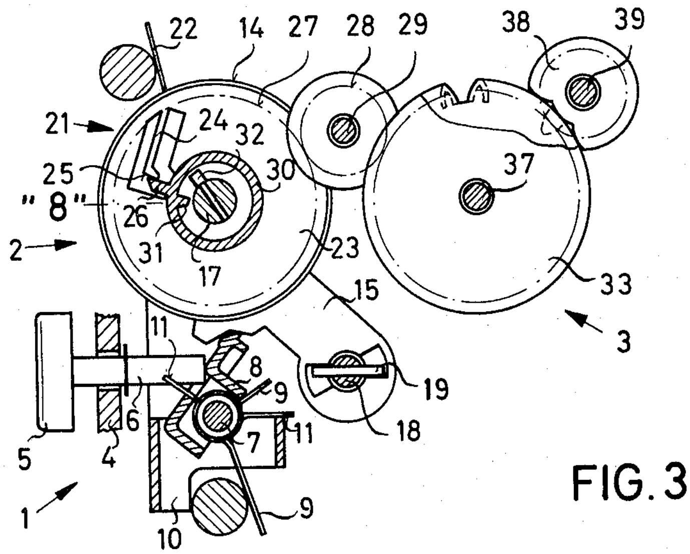
FIG. 3

PRESELECTION COUNTER WITH CONTINUOUS DISPLAY AND AUTOMATIC REPETITION OF A PRESET VALUE

The invention relates generally to preselection or presettable counters adapted to effect automatic repetition of a preset value, and more particularly to a counter of this type wherein the presettable indicating means will continuously provide an indication of the preset value during operation of the counter.

Generally, a preselection counter of the type to which the present invention relates is utilized in cooperation with a quantity counter in order to effect issuance of a defined number of units of a quantity in accordance with a set disposition from a larger store of the quantity. Such processes play an important role particularly when liquids are to be dispensed. Because of the need to dispense a specific quantity of a liquid, which quantity must be predetermined, a signal must be emitted when this quantity has been dispensed in order to achieve an exact switching-off process at the issuing machine.

In known embodiments of presettable preselection counters with automatic repetition of the predetermined value, there are normally provided two roller counters which are simultaneously arranged in driving connection with a measuring means for the quantities to be measured. Before the beginning of the dispensing process, the first counter is set to the desired quantity and it operates to count backwardly from the beginning of the dispensing process until finally an indication of the value "0" is reached, at which position, after a step-by-step reduction of the quantity issued, a signal is given for finally switching off the dispensing process.

The other roller counter begins the counting process from an initial position having the value "0" indicated and it adds the quantities issued until it reaches the predetermined value. By reversing the driving directions, the function of the counters is continually changed from one to the other.

Such a combination of counters during its operation will, on the one hand, indicate how many units have been issued by means of the adding counter. On the other hand, the subtracting counter will indicate how many units need to be dispensed until the final switching-off process. The disadvantage of this type of device is that the predetermined quantity to which the counter has been set cannot be immediately indicated or determined.

In another known embodiment of a preselection counter, disclosed in Swiss Pat. No. 403,357, a presettable predetermining counter is provided with automatic repetition of the preset value in which a setting of counter rollers is provided which indicates the preset value during the operation of the counter and which is in engagement with a second set of counter rollers which serve as an indicator for the predetermined value during operation of the counter which operates as a subtracting counter and which switches off after the value "0" has been reached. This counter, however, is of such a design that when the indicating number rollers are set to the predetermined value by means of intermediate gears, the switch-off counter is simultaneously also set to this value. In this device, the driving shaft as well as a star wheel and a counter shaft of the switch-off counter must, due to the driving engagement, make a full rotation so that the switch-off counter can be reset to the predetermined value. Thus, this means that in this device, for example, when a revolution of the driving shaft corresponds to 10 measuring units, the preset value at the indicator must be 10 measuring units "below" the effective value. For an effective value of 500 units, for example, the indicator must be set to 490 units. In order to effect a correction, there is provided written information to the effect that the indicator value of 10 units must be added in order to arrive at the real predetermined value. Such measures naturally lead to complexity and misunderstanding in the operation of the device and tends to increase the difficulty thereof.

Accordingly, the present invention is directed toward provision of a preselection counter adapted to effect automatic repetition of a preset value which, during the entire operating stage of the counter, will provide an indication of the real preset value. The invention provides a counter which is relatively simple in structure with relatively fewer moving parts enabling a preset value to be set and stored into a switch-off counter while also enabling reliable resetting of the preset value.

SUMMARY OF THE INVENTION

Briefly, the present invention may be described as a preselection counter capable of effecting automatic repetition of a preset value while maintaining a continuous display of the preset value during operation of the counter comprising a switch-off counter adapted to actuate a desired function when a quantity of the function determined by said preset value has been reached, presettable indicating means including number rollers adapted to establish the preset value and to additionally serve the function of a lockable storage means storing said preset value, the presettable indicating means being settable to locking positions in a presetting stage separately from said switch-off counter, a sensing wheel, and an elastic locking pawl mechanism, said number rollers of said indicating means cooperating by means of said sensing wheel with said switch-off counter through said elastic locking pawl mechanism so that the number rollers of the indicating means are freely settable in the presetting stage while separately thereof the sensing wheels of the switch-off counter are movable to take up values in the same sense of rotation as the number rollers by means of their own spring drive.

Thus, in accordance with the present invention, the presettable indicating means may be used additionally as a lockable storage means which may be set to a preset value in a predetermining stage separate from the switch-off counter and which may operate to store the preset value to enable the preset value to be repeatedly used and to be selectively reset. The number rollers of the indicating means cooperate with the sensing wheels of the switch-off counter by means of an elastic locking pawl mechanism so that the number rollers of the indicating means may be freely settable in the predetermining stage while the setting wheels of the switch-off counter are separately movable to a stop position at the indicated position of the number rollers by their own spring drive in order to have set therein the value in the same sense as the indicating means.

An advantage of the invention resides in the fact that the presettable indicating means may be separated from the actual switch-off counter which basically involves a reduction in the driving torque on the part of the measuring means. In accordance with the proposed design and in accordance with its destination, the indicating means for once serves in the predetermining stage to set up the values decade by decade in a known manner; see for example German Offenlegungsschrift No. 26 47 127. On the other hand, the indicating means additionally serves as an arrestable storage means in order to take up the predetermined value to be repeatedly read out. An adjusting and fixing lever not only serves to adjust the number rollers to a whole number position, but also to secure them against unwanted switching by means of a push button, but also in connection with the switch-off counter the indicating means fulfills the function of a lockable storage means by controlled engagement with the adjusting and fixing lever.

The rigid blocking of the counter is released only for such stages of the entire function in which a setting of a new value is possible. The criterion for a repeated read out of the value position of the number rollers of the indicating means is effected by a relatively simple mechanism whereby the number rollers cooperate with the sensing wheel of the switch-off counter through an elastic pawl or ratchet mechanism. A radially elastic arm with a pawl-shaped stop forms a part of the pawl mechanism which, in an advantageous manner, is formed as a single part together with the number roller and which projects externally therefrom into the wheel disc of the number roller. This elastic arm with the stop allows the number rollers to be set to any position during the presetting stage and also to be set beyond the value "9" position. During presetting of the value, the stop at the number rollers is brought to a corresponding angular position and projects into the circular range of movement of a projection at the sensing wheel. When transfer of the preset value from the indicating means to the switch-off counter through a switch mechanism is initiated, the sensing wheel rotates in the setting direction of the number rollers and engages at the stop on the number roller. Since the arm with the stop runs in the same direction as the force produced by the projection, the arm with the stop can be considered as a rigid stop. Since the setting process of the actual switch-off counter is separated from the presetting process of the indicating means, each indicating position may be transferred into the switch-off counter in exact agreement with the indicated preset value.

In order to reset the switch-off counter to the predetermined value, no measuring units on the part of the counter drive are required. The switch-off counter is rather independently newly preset to the predetermined value by a spring driving mechanism via the sensing wheels. For this, the sensing wheels are rotatably mounted on a control shaft and are positively influenced by a driving pin at the control shaft. By means of the control shaft, the sensing wheels are also directly movable to individual sensing positions and they are commonly reset to the initial position in another functional stage. Since the presetting indicating means and the process of transferring the values to the switch-off counter are separate from the operation of the actual switch-off counter, the driving torque required for the counter is greatly reduced since only very few parts of the switch-off counter must be moved.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DESCRIPTION OF THE DRAWINGS

In the drawings:

FIG. 2 is a view similar to FIG. 1A showing the number roller in the preset position of the value or numeral "8" and the initial position of the switch-off counter; and FIG. 3 is a view similar to FIG. 2 showing the switch-off counter in sensing respectively taking-over position for the value "8".

DETAILED DESCRIPTION OF THE PREFERRED EMBODIMENT

Figure 1A:
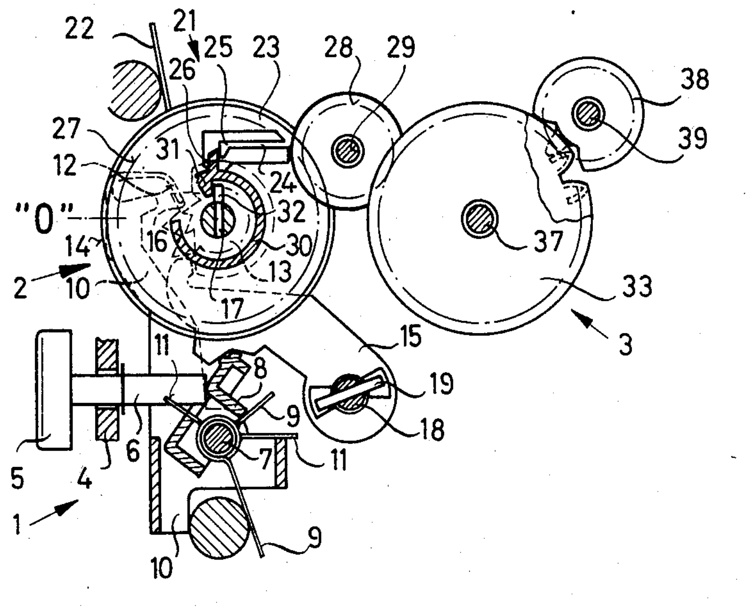
FIG. 1A is a diagrammatic representation, partially in section, showing the number rollers of the indicating means of the mechanism of the invention in cooperation with a sensing wheel of a switch-off counter in its initial position.

In order to simplify and clarify the disclosure of the invention, and also to provide a better understanding thereof, the invention will be described by referring to only a single decade of the aforementioned preselection counter. Furthermore, parts of the control device which are not immediately required for an explanation of the invention have been omitted for simplification.

Referring now to the drawings, a preselection counter in accordance with the present invention is depicted which consists essentially of a setting device 1, presettable indicating means 2 and a switch-off counter 3.

The setting device 1 for each decade consists of a manually operable button or key 5 which protrudes above a housing wall 4 and which, by means of a key shaft 6, cooperates with a switching pawl 8 rotatably mounted on a shaft 7 and under spring influence against the setting movement.

The switching pawl 8 is maintained in engagement with the key shaft 6 by means of a torsion spring 9 which operates in the counterclockwise direction. The spring 9 simultaneously sets a switching pawl arm 10 to an initial position. The switching pawl arm 10 is also rotatably mounted on the shaft 7 and is influenced by a torsion spring 11 in the clockwise direction.

When the key 5 is actuated, the switching pawl arm 10 is released and a pawl point 12 thereof engages a switching wheel 13 which is firmly connected with a number roller 14 of the indicating means 2.

Due to the driving effect of the torsion spring 11, the pawl point 12 switches the number roller 14 in a clockwise direction by one step or numeral. This is possible on the condition that the control pawl 8 has simultaneously also unlocked an adjusting and fixing lever 15 so that the lever 15 is moved out of engagement with a fixing star 16 of the number roller 14. The switching wheel 13 and the fixing star 16 are formed as one piece together with the counter roller 14 and are rotatably mounted on a control shaft 17.

It is the primary object of the adjusting and fixing lever 15 to adjust the number roller 14 to an indicating position representing a whole number during the setting process. Additionally, the number roller 14 becomes fixed in position and operates as a lockable storage means in that the control shaft 18, during the functional stages of sensing the preset values, as well as during the counting process, is arrested by a pin 19 keeping the adjusting and fixing lever 15 in engagement so that an unchanged setting of a repeatedly reproducible preset value is furnished. To transfer the values set in the number rollers 14 of the indicating means 2, engagement is provided with a sensing wheel 20 of the switch-off counter 3 by means of an elastic locking pawl mechanism 21 so that the number roller 14 of the indicating means 2 may be readily set to a value position in the predetermining stage. The sensing wheel 20 is provided with an independently effective spring drive in the form of a torsion spring 22 by means of which the sensing wheel 20 is moved in the same sense as the setting direction of the number roller 14 to a stop position at the indicating position of the number roller 14.

The locking pawl mechanism 21 between the number roller 14 and the sensing wheel 20 consists of a radially elastic arm 24 penetrating from externally between the wheel disc 23 of the number roller 14, which arm 24 has a pawl-shaped stop 25 which cooperates with a projection 26 at the sensing wheel 20 which simultaneously radially projects into the circular range of movement of the stop 25.

When the sensing wheel 20 is rotated in the setting direction, the projection 26 engages the stop 25, the latter being a fixed stop in the direction of the arm 24 due to its deformation axis. The sensing wheel 20 is in the form of a toothed wheel having teeth 27 and is continuously in engagement with a coupling wheel 28 which is axially movable and rotatable on a shaft 29.

The projection 26 extends radially at an axially protruding collar 30 and is formed as one piece with the sensing wheel 20. The collar 30 also has a fast stop nose 31 which extends radially inwardly and into the operating range of a driving pin 32 of the control shaft 17.

Due to the spring drive by means of the independently effective torsion spring 22 in the setting direction, the sensing wheel 20 which is rotatably mounted on the control shaft 17 comes into engagement with the driving pin 32 at the control shaft 17 or at the stop 25 in the number roller 14. When rotating the shaft 17 in the setting direction (in the clockwise direction as seen in FIGS. 1A, 2, and 3) in order to effect value transfer from the number roller 14 to the switch-off counter 3, the control shaft 17 under control of a switching device (not shown) makes an angular movement corresponding to the value positions "0" through "9".

Correspondingly, the sensing wheel 20 due to the effect of the torsion spring 22 and the stop nose 21 engaging at the driving pin 32 follows this setting movement until the simultaneously moving projection 26 engages the stop 25 at the preset and arrested number roller 14.

Figure 1B:
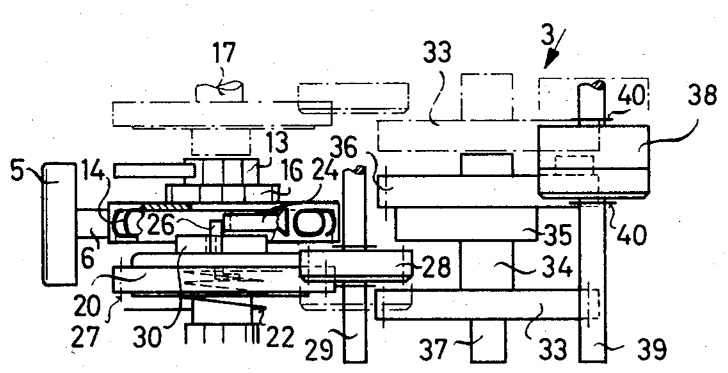
FIG. 1B is a top view of the arrangement of FIG. 1A showing one of the predetermining decades of the system.

For this functional stage of value transfer from the number roller 14 to the switch-off counter 3, the coupling wheel 28 may be moved axially into engagement with a counting wheel 33 of the switch-off counter 3 (see FIG. 1B). The switch-off counter 3 consists for one decade of the counting wheel 33 which is a spur gear which is firmly connected by means of a bushing 34 with a counting cam 35 and a tens transfer wheel 36. The counting wheel 33, the counting cam 35, and the tens transfer wheel 36 for one decade are rotatably mounted on a shaft 37 and are in driving connection in a known manner with the counting wheel 33 of the next decade by means of the tens transfer mechanism.

The tens transfer mechanism is rotatably mounted on an axially displaceable shaft 39. The tens transfer mechanisms 38 are axially secured on the shaft 39 by means of washer discs 40. A control cam within the switching means (not shown in detail) serves to axially unclutch the tens transfer mechanism 38 (upwardly as seen in FIG. 1B) and simultaneously moves the coupling wheel 28 into engagement with the counting wheel 33.

During the functional stage whereby the preset values are transferred from the number roller 14 to the coupling wheel 28 by means of the sensing wheel 20 and into the counting wheel 33, the tens transfer mechanisms 38 are maintained out of engagement with the tens transfer wheel 36. Therefore, it can be freely rotated together with the counting wheel 33 of the next following decade remaining in engagement in correspondence with the setting of this decade.

After the counting wheel 33 and the counting cam 35 have been set, the coupling wheel 28 and the tens transfer mechanism 38 take the position shown in FIG. 1B. The switch-off counter 3 is continuously driven in a known manner. The counting cams 35 move sensing arms (not shown) which, when the preset value at the counter has been reached, release a switch-off process. Thus, it can be said that the switch-off counter operates to actuate a desired function when a quantity of that function determined by the preset value has been reached.

Before each new counting process, the sensing wheels are moved to their initial position simultaneously with rotation of the control shaft 17 contrary to rotation in the setting direction. This is effected in that one driving pin 32 each touches against the stop nose 31 in the sensing wheel 20 and moves the latter to the initial position.

Before the beginning of a new counting process, the preset value is again transferred to the switch-off counter 3 in a predetermined manner by rotation of the control shaft 17 over a full setting distance. In the functional stage preparatory to effecting a count, the presettable indicating means as well as the sensing wheel 20 remain out of engagement with the switch-off counter 3. In this stage, the number rollers 14 are also in a blocked position under the control of the switching mechanism according to FIG. 3 by the adjusting and fixing lever 15. The arresting position of the number rollers 14 is maintained as long as the control shaft 18 (in the clockwise direction) keeps the adjusting and fixing lever 15 in engagement with the fixing star 16. The function of placing values into the switch-off counter 3 will be explained hereinafter. In accordance with the representation in FIG. 1A, the preselection counter is shown in its initial position for input of values. The indicating rollers are in the indicating position for the value "0". The sensing wheel with the torque of the torsion spring 22 rests in the clockwise direction over the stop nose 31 at the driving pin 32 in the shaft 17. The coupling wheel 28, as may be seen from FIG. 1B, is axially uncoupled from the counting wheel 33. A tens transfer mechanism 38 is coupled with the counting wheel 33 of a next decade.

FIG. 2 shows the preselection counter with the number roller 14 adjusted to the numeral "8", by way of example. The numeral input is effected by means of the pressure key or button 5 through the pawl arm 10 to the number roller 14. At each repeated operation of the pressure key or button 5, the number roller 14 with its radially elastic stop 25 is switched through a one digit value by rotation through 36° in the setting direction, i.e., in the clockwise direction. When values are set beyond the value "9", i.e., when switching occurs from "9" to "0", the elastic arm 24 may radially evade and the stop 25 can go into operation again behind the projection 26. During the presetting, the sensing wheel 20 rests in the initial position shown in FIG. 1A.

To transfer the position set up from the counting wheel 33, the tens transfer mechanism 38 is axially moved out of engagement with the tens transfer wheel 36 (see the dash-dot line in FIG. 1B). The sensing wheel 20 is brought into engagement with the counting wheel 33 of the switch-off counter 3 through an axial movement of the coupling wheel 28. The control shaft 17 is rotated in a clockwise direction as seen in FIG. 3 over a full setting distance (324°). The sensing wheel 20 follows this rotation due to the effective torque of the torsion spring 22 until the projection 26 of the sensing wheel 20 has come into engagement with the stop 25 of the number roller 14.

The value preset at the number roller 14 has therefore been transferred to the counting wheel 33. The coupling wheel 28 is now brought out of engagement with the counting wheel 33 and in the same functional stage the tens transfer mechanism 38 may be re-engaged with the tens transfer wheel 36. The control shaft 17 is rotated back to the initial position and thereby brings all the sensing wheels 20, in common, back to the initial position for sensing a new value from the number rollers 14. After the counting process in the switch-off mechanism has been terminated, the preset values are again brought to predetermined positions by operation of the switching mechanism.

Accordingly, it will be evident from the foregoing description that during the operation of the device, the numerical value preset on the number wheels 14 will be visible throughout the operation of the device and that this numerical value may be retained through repeated cycles of the switch-off counter 3 and may be repeatedly transferred to the switch-off counter 3.

Of course, a new preset value may be entered into the presettable indicating means 2 at any time by operation of the manually operable button or key 5, in the manner previously described. However, if desired, a particular preset value may be retained and repeatedly transferred to the switch-off counter 3 after each cycle of operation thereof.

It will also be apparent that, after each cycle of operation of the switch-off counter 3, the sensing wheel 20 for each decade is reset to the numerical value which has been preset on the cooperating number roller 14 and that by axial displacement of the coupling wheel 28, this preset numerical value may, for each decade, be transferred from the sensing wheel 20 to the counting wheel 33 through the coupling wheel 28.

While a specific embodiment of the invention has been shown and described in detail to illustrate the application of the inventive principles, it will be understood that the invention may be embodied otherwise without departing from such principles.

What is claimed is:

1. A preselection counter adapted to effect automatic repetition of a preset value and capable of maintaining a continuous display of said preset value during operation thereof comprising: switch-off counter means adapted to actuate a desired function when a quantity of said function determined by said preset value has been reached; presettable indicating means including number rollers adapted to be set at said preset value and to retain said setting until reset, said presettable indicating means being adapted to display said retained preset value; sensing wheel means operably interposed between said switch-off counter means and said presettable indicating means adapted to be placed in transmitting engagement therebetween to transmit the preset value on said indicating means to said switch-off counter means and to be removed from transmitting relationship therebetween during operation of said switch-off counter means to actuate said desired function; and means for resetting said sensing wheel means in accordance with the preset value on said presettable indicating means without altering the setting of said presettable indicating means.

2. A counter according to claim 1 wherein said resetting means comprise torsion spring means urging said sensing wheel means in a direction to facilitate resetting thereof to the preset value on said presettable indicating means.

3. A counter according to claim 1 further including means for selectively changing the setting of said presettable indicating means to a new preset value independently of the operation of said switch-off counter means.

4. A counter according to claim 1 wherein said sensing wheel means include coupling wheel means adapted to be axially displaced to place said sensing wheel means into and out of engaging relationship with said switch-off counter means.

5. A counter according to claim 1 wherein said sensing wheel means and said number rollers of said presettable indicating means are arranged in generally coaxial relationship and wherein stop means interposed therebetween operate to permit said sensing wheel means to be repeatedly reset to the preset value on said presettable indicating means after each cycle of operation of said switch-off counter means without requiring alteration of the setting of said presettable indicating means.

* * * * *